United States Patent [19]

Etani et al.

[11] 3,954,621

[45] May 4, 1976

[54] FILTRATION SYSTEM HAVING PREFILTER AND MAIN FILTER

[76] Inventors: Kenji Etani; Nancy A. Etani, both of W. Meadow Road, West Townsend, Mass. 01474

[22] Filed: June 24, 1974

[21] Appl. No.: 482,245

Related U.S. Application Data

[63] Continuation of Ser. No. 357,839, May 7, 1973, abandoned.

[52] U.S. Cl. .................................. 210/314; 210/169; 210/316; 210/333 R; 210/416
[51] Int. Cl.² ..................................... B01D 23/24
[58] Field of Search ........... 210/169, 314, 316, 317, 210/333, 356, 484, 496, 416 AS, 79

[56] References Cited
UNITED STATES PATENTS

| | | | |
|---|---|---|---|
| 3,138,552 | 6/1964 | Richards | 210/169 X |
| 3,173,865 | 3/1965 | Bosico | 210/169 |
| 3,221,888 | 12/1965 | Muller | 210/333 |
| 3,360,131 | 12/1967 | Witkowski | 210/456 |
| 3,513,977 | 5/1970 | Bellinson | 210/169 X |
| 3,556,304 | 1/1971 | Collard | 210/496 X |
| 3,618,774 | 11/1971 | Delphia | 210/317 X |
| 3,771,664 | 11/1973 | Schrink et al. | 210/484 X |
| 3,817,381 | 6/1974 | Heskett et al. | 210/496 X |

*Primary Examiner*—Charles N. Hart
*Assistant Examiner*—Robert G. Mukai
*Attorney, Agent, or Firm*—Morse, Altman, Oates & Bello

[57] ABSTRACT

A filtration system comprises a relatively thin prefilter medium and a relatively thick main filter medium, which are so related that the pore size of the prefilter medium is no greater than the pore size of the main filter medium. The purpose of the prefilter medium is to prevent premature clogging of the surface of the main filter medium. The arrangement is such that backwashing or replacement of the prefilter medium can be effected readily in order to prolong the life of the main filter medium.

1 Claim, 8 Drawing Figures

FILTRATION SYSTEM HAVING PREFILTER AND MAIN FILTER

This is a continuation of application Ser. No. 357,839 filed on May 7, 1973, now abandoned.

BACKGROUND OF THE INVENTION

1. Field of the Invention

The present invention relates to filtration systems by which liquids or gases may be clarified in order to separate suspended constituents of a fluid from a filtrate and, more particularly, to filtration systems by which a liquid or gas may be cleansed of suspended particles by a filter medium, which transmits the fluid and captures the particles.

2. The Prior Art

In conventional depth filtration systems, such as a sand filter system, the upstream surface of the filter medium often becomes clogged by large particles. When an impermeable layer is thus formed on the upstream surface, the pressure drop across this impermeable layer increases. As a result, the filtration rate decreases as the large particles on the surface increase, and finally filtration almost stops so that the filter medium must be cleaned or replaced before it has been permeated by the smaller particles. In certain systems, the surface of the filter medium becomes so rapidly coated with an impermeable layer of large particles that a scraper or the like must be operated continuously in order to keep the upstream surface clear. In other words, the upstream surface of the medium typically becomes clogged while a major portion of the interior of the filter medium remains in relatively clean condition.

When the filter medium is made of flexible foam material, upstream pressure forces the impermeable layer downstream-ward, deforming the filter medium in the direction of the flow. When an impermeable layer is formed on the upstream surface, the fluid tries to find a way to flow and seeps between the filter medium and the container walls. This results in the deposition of larger particles on the sides of the filter medium as well. In consequence a small clearance between the filter medium and the container walls is caused. Then the fluid seeps more deeply downstream, so that deformation becomes greater. In addition to the impermeable layer, compression of the flexible foam by deformation suppresses the filtration rate.

SUMMARY OF THE INVENTION

The primary object of the present invention is to associate a relatively thick main filter medium with a relatively thin prefilter medium, which captures large particles before they reach the main filter medium and which can be cleansed easily without replacing the main filter medium. In a preferred form, the prefilter medium in the direction of fluid flow is no more than ½ inch in maximum thickness and no more than 1/10 of the thickness of the main filter medium. The main filter medium, which is downstream, is relatively thick so as to be capable of capturing smaller particles throughout its depth. In other words, after the larger particles are eliminated by the prefilter medium, depth filtration takes place throughout the main filter medium, by which the distribution of contaminants inside the main filter is extended. The resulting filtration system is simple to operate and economical to maintain.

Other objects of the present invention will in part be obvious and will in part appear hereinafter.

The invention accordingly comprises the apparatus and process, together with their components, steps and interrelationships, which are exemplified in the present disclosure, the scope of which will be indicated in the appended claims.

BRIEF DESCRIPTION OF THE DRAWINGS

For a fuller understanding of the nature and the objects of the present invention, reference is made to the following detailed description, taken in connection with the accompanying drawings wherein.

DETAILED DESCRIPTION OF THE PREFERRED EMBODIMENT

Generally, each of the illustrated filtration systems comprises a mechanical prefilter medium and a mechanical main filter medium, which are so related that the thickness of the prefilter medium is no more than one-tenth of the thickness of the main filter medium and that the pore size of the prefilter medium is no larger than the pore size of the main filter medium. Typically, the prefilter medium is composed of open celled polymeric foam such as polyurethane, although alternatively it is a fabric or mesh that is woven, knitted, or felted, for example composed of a linear polyamide such as that sold under the trademark Nylon by DuPont or a metal such as stainless steel. Preferably, at least 90% of the pore sizes of the prefilter medium and at least 90% of the pore sizes of the main filter medium range from 0.05 to 0.0005 inch. In one form, the main filter, which comprises an open celled polymeric foam such as polyurethane as above, is an integrated mass or a shredded mass. Typically, the polyurethane used herein is characterized by a volume of which only at most 10 percent is composed of an elastomeric solid and the remainder is composed of voids. In another form, the main filter is composed of granules of an inert material, for example, granules of sand. In any event, the pore size of the prefilter is no greater than the pore size of the main filter. Preferably the prefilter ranges in thickness in the direction of flow up to ½ inch and the main filter ranges in thickness at least in excess of 1 inch. This construction has been found to be simple to operate and economical to maintain because only the prefilter need be backwashed or replaced while the main filter is left in place for a protracted period of time. Once the main filter becomes saturated with particles, it also can be easily removed for cleaning or replacement.

Figure 1:
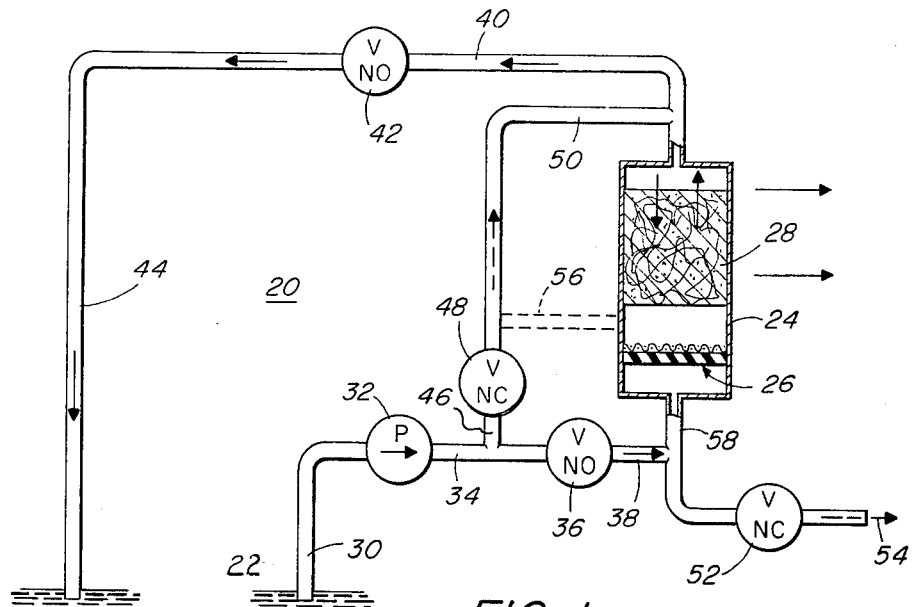
FIG. 1 is a schematic diagram of a filtration system embodying the present invention.

FIG. 1, illustrates a system 20 for purifying a liquid 22, for example, the water of a swimming pool. Filtration system 20 comprises a cylindrical chamber 24, within which are positioned a prefilter 26 and a main filter 28. During the normal operating cycle, water is forced from pool 22 in a circuit that includes, in sequence, a conduit section 30, a pump 32, a conduit section 34, a normally open valve 36, a conduit section 38, prefilter 26, main filter 28, a conduit section 40, a normally open valve 42 and a conduit section 44. During such normal operation, particles larger than the pore size of prefilter 26 are captured at the upstream surface of this prefilter and prevented from reaching main filter 28. On the other hand, particles smaller than the pore size of prefilter 26 reach main filter 28 and are entrapped deeply within main filter 28. In order to backwash prefilter 26, valve 36 and valve 42 are closed and water is forced by pump 32 through a conduit section 46, a normally closed valve 48, a conduit section 50, main filter 28, prefilter 26, a conduit section 58, and a normally closed valve 52 to a waste receptacle 54. During this backwash period, which is extremely short in comparison with filtration, the larger particles, which have accumulated on the prefilter 26, are washed through normally closed valve 52 to waste receptacle 54. In an alternative embodiment, a conduit section 56, shown in dashed lines, directs backwashed water into the space between prefilter 26 and main filter 28, for the purpose of cleaning the prefilter only.

Figure 2:
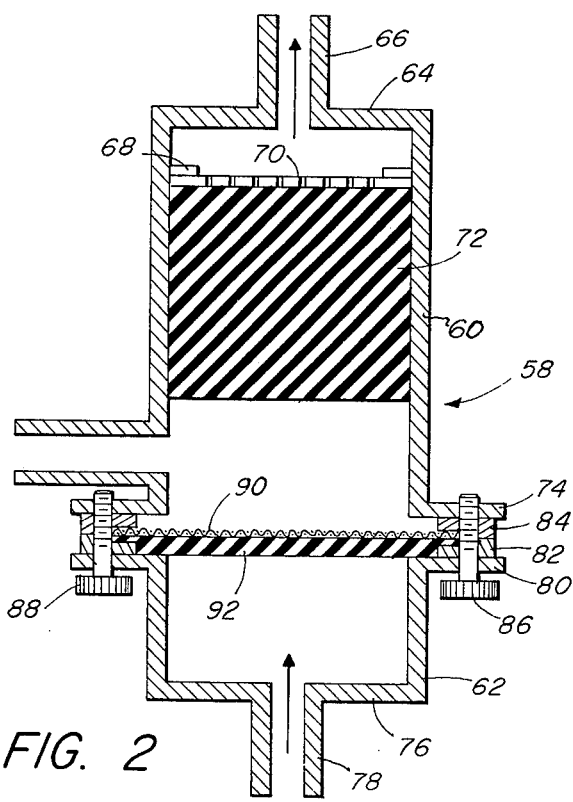
FIG. 2 is a detail view, in cross-section, of a component of the system of FIG. 1.

As shown in FIG. 2, chamber 24 is defined by housing 58, which includes a fixed cap portion 60 and a detachable cap portion 62. Cap portion 60 has a base 64 with an outlet 66, through which fluid from within the chamber is flowed. An internally directed peripheral flange 68 serves as an abutment for positioning a rigid screen 70. Main filter 72 is situated within cap 60 abutting screen 70. Cap portion 62 has a base 76 with a central inlet 78 and has an externally directed flange 80. Flanges 74, 80 are spaced from each other by a pair of gaskets 82, 84 that are apertured to receive a series of set screws 86, 88, which project through holes in flange 80 and holes in gaskets 82, 84 and are turned into threaded holes in flange 74. A prefilter 92 and a supporting mesh 90 are sandwiched between gaskets 82 and 84. During the backwashing operation, the thin layer of the prefilter distends by the force of the liquid, stretching the layer in such a way that entrapped particles are readily released. In practice, it is apparent that prefilter 92 and main filter 72 can be readily replaced, although prefilter 92 is designed for replacement independently of main filter 72.

Figure 3:
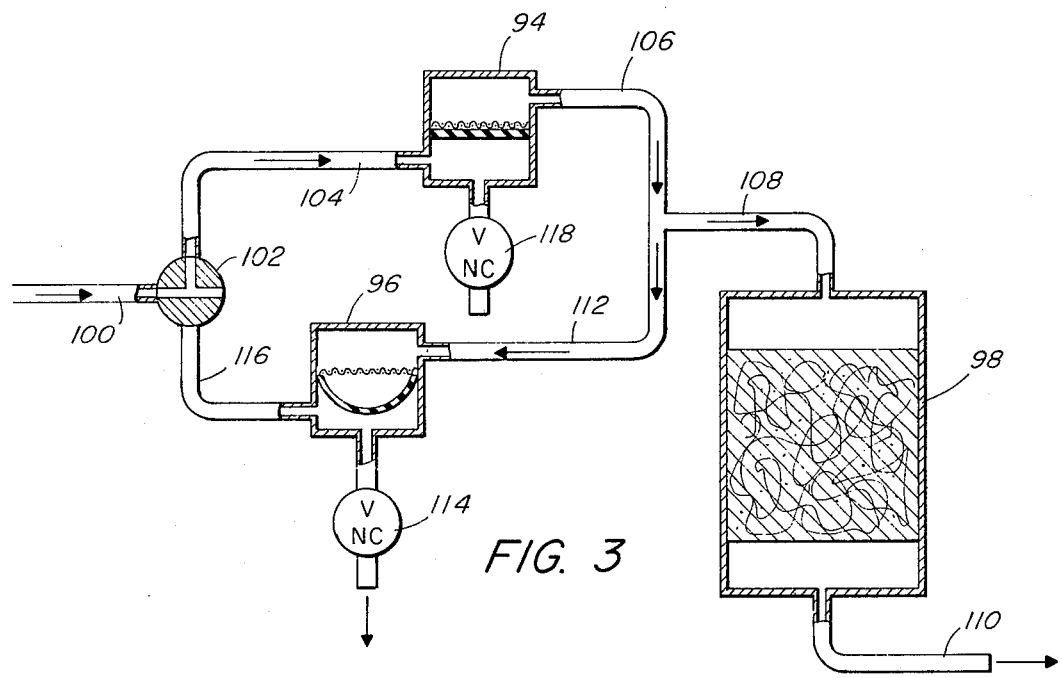
FIG. 3 is a schematic diagram of another filtration system embodying the present invention.

An alternative embodiment of the present invention is shown in FIG. 3 as comprising a pair of prefilter chambers 94, 96 and a main filter chamber 98. In a first mode, liquid to be purified enters the system through a conduit section 100, is transmitted through a three way valve 102, a conduit section 104, prefilter 94, and a conduit section 106 and a conduit section 108 to a main filter chamber 98. Thereafter the liquid is sent through a suitable outlet 110. In this mode, fluid from prefilter 94 also flows through a conduit section 112 to the downstream end of prefilter chamber 96 in order to backwash the prefilter medium in chamber 96. The resulting waste effluent is discharged to a waste receptacle through a valve 114, which is open during this mode and closed during other modes. In a second mode, valve 102 is rotated so that liquid entering conduit section 100 flows through valve 102, conduit section 116, prefilter chamber 96, conduit section 112, conduit section 108 and main filter chamber 98. In this second mode, a valve 118 is opened and fluid from conduit section 112 also flows through conduit section 106 and through prefilter chamber 94 in order to backwash the prefilter medium in chamber 94 and to flow waste through valve 118, which is open during this mode and closed during other modes. In a third and normal operation mode, valve 102 is rotated so that normal flow through both prefilter chambers 94, 96 to main filter chamber 98.

Figure 4:
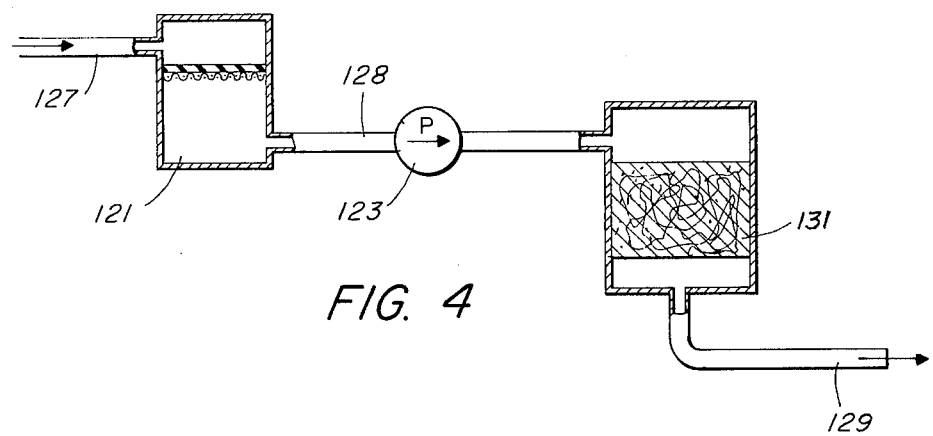
FIG. 4 is a schematic diagram of another filtration system embodying the present invention.
Figure 5:
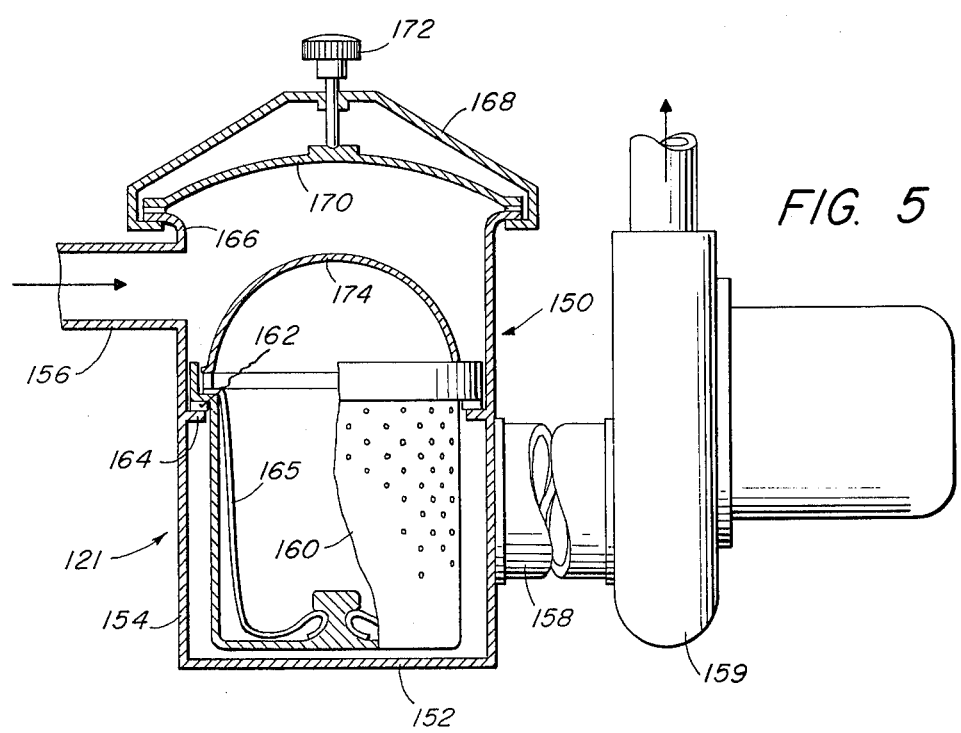
FIG. 5 is a detail view, partly broken away and partly in section, of a component of the system of FIG. 4.

An alternative embodiment of the present invention, shown in FIG. 4, is useful, for example, for swimming pools, and differs from the systems shown in FIG. 1 and FIG. 3. A pump 123 is located between a prefilter 121 and a main filter 125. As shown, water from a water supply to be purified is drawn through a conduit section 127 and prefilter 121 by pump 123. Pump 123 then forces the water through main filter 125 and conduit section 129. Details of prefilter 121 are shown in FIG. 5 as comprising a housing 150 defining a cylindrical chamber having a closed bottom 152 and cylindrical side walls 154. There are an inlet 156 at an upper portion of side wall 154 and an outlet 158 at a lower portion of side wall 154. Outlet 158 leads to pump 159, which forces the water from within the housing to the main filter. Within the housing is a reticulated cup 160, which serves the combined purposes of a lint pot (or strainer basket) and a prefilter container. Cup 160 has an outwardly directed flange 162 at its upper periphery, which rests on an inwardly directed flange 164 that is integrally connected to the inner surface or side wall 154. Within cup 160 is a prefilter bag 165 that is detachable from the cup. The upper periphery of side wall 154 is provided with an externally directed flange 166. Flange 166 is adapted to engage the inwardly directed lug of a springy metal yoke 168, which is associated with a pot cover 170. Cover 170 is held tightly in place by a set screw 172, which turns into a threaded bore in yoke 168 and bears against cover 170. When yoke 168 and cover 170 are removed, cup 160 can be withdrawn from within the housing by a handle 174. Prefilter bag 165 can be easily cleaned and can be removed from cup 160 for replacement.

Figure 6:
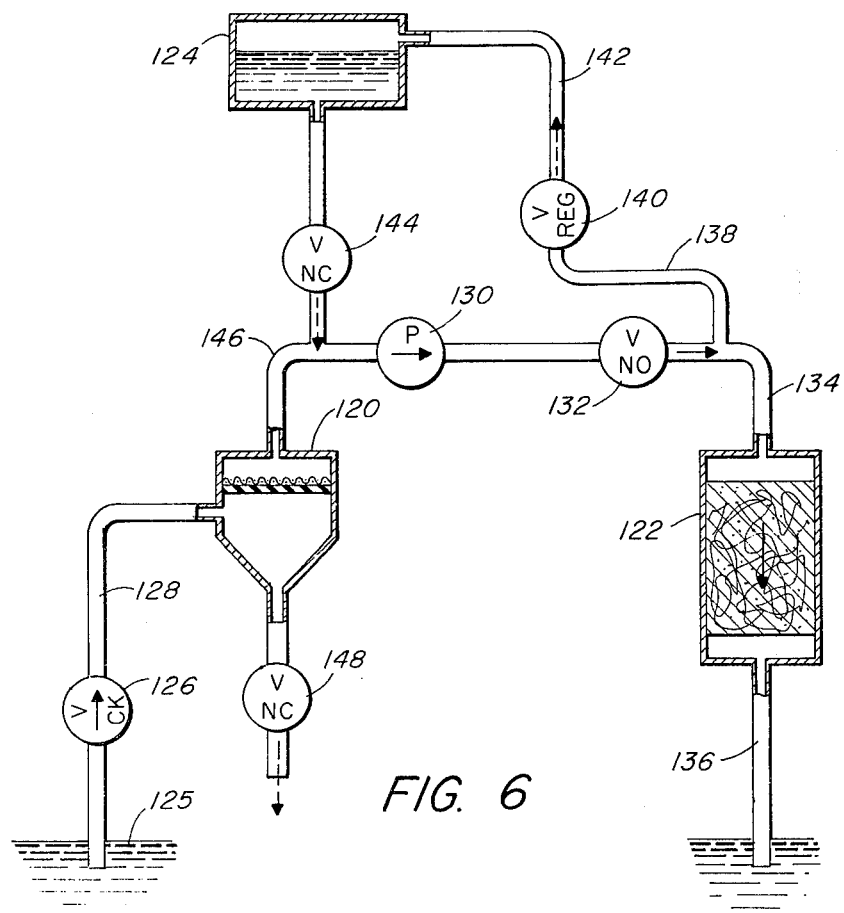
FIG. 6 is a schematic diagram of another filtration system embodying the present invention.

FIG. 6 illustrates another system embodying the present invention, in which debris and residue are cleared from the prefilter by an automatic backwashing technique. This system includes a prefilter 120, a main filter 122 and a reservoir 124, which is regulated at a constant water level. As shown, water from a water supply 125 to be purified is drawn through a check valve 126, a conduit section 128, and a prefilter 120 by a pump 130. Pump 130 forces the water through a normally open valve 132, a conduit section 134, main filter 122, from which it is discharged through conduit section 136. During operation of pump 130, water is also forced through a conduit section 138, a regulating valve 140, and a conduit section 142 to reservoir 124, which is for backwashing prefilter 120. During the backwashing operation, valve 132 is closed, and a normally closed valve 144 is opened so that water flows from the reservoir through valve 144 and a conduit section 146 into prefilter chamber 120. In consequence, backwashing occurs and the debris and residue are discharged through a normally closed valve 148 for disposal in a suitable waste receptacle. When filtration is resumed with valve 132 opened and valves 144 and 148 closed, reservoir 124 fills with water until the normal level is reached.

Figure 7:
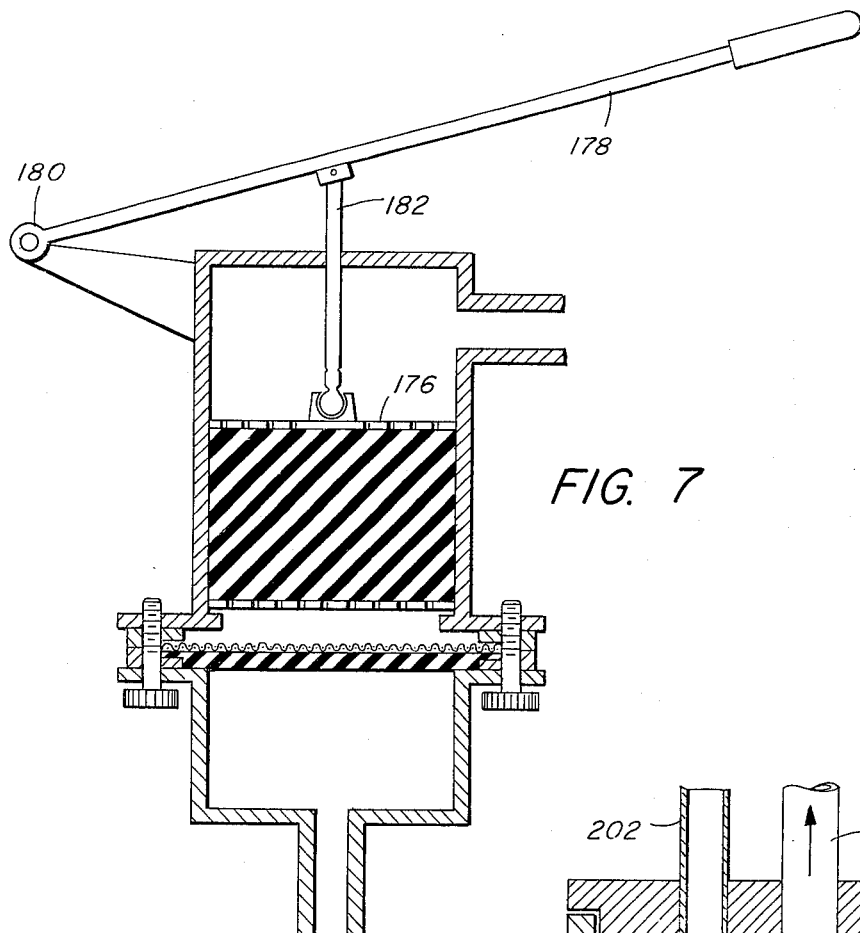
FIG. 7 is a detail view, partly broken away and partly in cross-section, of an alternative component for use in any of the systems of FIGS. 1, 3, 4 and 6.

It has been found that when the main filter medium is composed of an open-celled flexible foam, such as polyurethane, squeezing the main filter medium during backwashing can cause release of some of the captured particles for disposal with the residue deposited on the prefilter. FIG. 7 illustrates a prefilter and main filter chamber that is analogous to that of FIG. 2. In addition to the components of FIG. 2, however, this prefilter and main filter combination includes a perforated piston 176 which is controlled by a lever 178. Lever 178 is pivoted to an edge of the chamber at 180 and acts on perforated piston 176 via rod 182. Rod 182 is slideably and pivotally connected to a medial point of lever 178 at its upper extremity and is fixed to piston 176 at its lower extremity.

Figure 8:
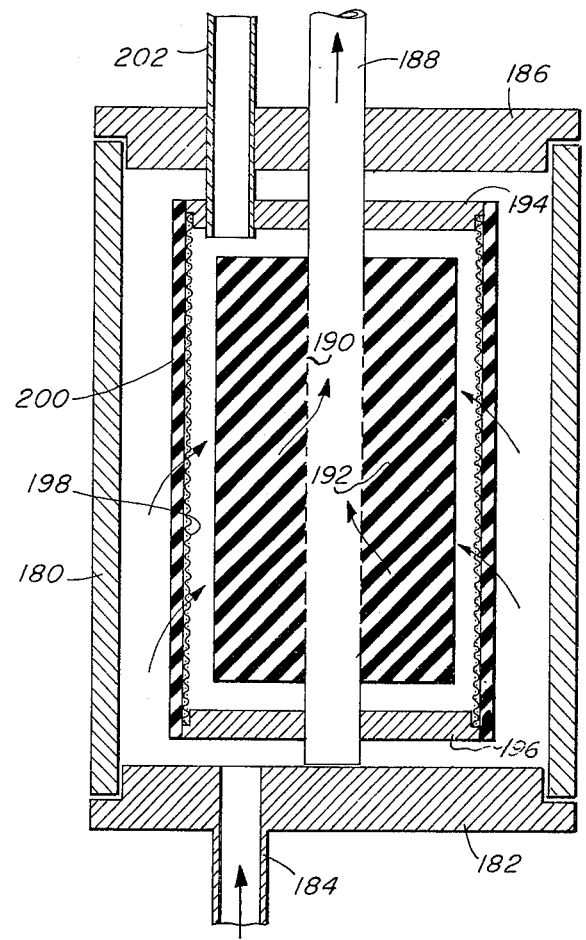
FIG. 8 is a detail view, partly broken away and partly in cross-section, of another alternative component for use in the system of FIG. 1.

FIG. 8 illustrates a filter chamber in which the prefilter and the main filter have configurations other than those previously illustrated and described. In this modification, the prefilter and main filter are in the forms of concentric shells that are located within a tubular housing 180. As shown, the lower end of tubular housing 180 is provided with a cap 182 having an inlet 184 and the upper end of tubular housing 180 is provided with a cap 186 having an outlet 188. Outlet 188 is in the form of a tube that extends through housing 180 from top to bottom, its medial portion being perforated as at 190. Main filter 192 surrounds tube 188 particularly in its medial region. Carried by tube 188 are a pair of discs 194, 196 about which a tubular screen 198 is disposed. At the external periphery of tubular screen 198 is prefilter 200. As shown, fluid entering the chamber within housing 180 in sequence, flows through prefilter 200, main filter 192, perforations 190 and outlet 188. It will be appreciated that backwashing by reverse flowing through a tube 202 effects the same freeing of prefilter 200 from larger particles as was effected in the embodiments previously described.

EXAMPLE I

An experiment for water filtration was carried out with the prefilter medium and the main filter medium installed in a transparent plastic pipe, composed of methyl methacrylate sold under the trademark Plexiglass or Lucite, through which filtration phenomena, e.g. backwashed particles released from the filter medium and the prefilter medium during this operation could be readily observed. The following phenomena were observed:

1-a. Based on repeated evidence, at the end of a filtration cycle, the main filter medium, when composed of polyurethane, was filled throughout with particles captured during filtration. Typically the flow velocity was 0.05 feet per second.

1-b. Mono- and multi-filament synthetic fiber screens were used, instead of polyurethane, as the prefilter medium together with a main filter medium consisting of polyurethane. The upstream surface of the main filter medium did not become coated with larger particles. It became evident that screen or mesh can replace polymeric foam material as a prefilter medium. The pore size must be selected properly. If the pore size of the screen or mesh is too small, the prefilter easily becomes clogged and must be backwashed with unnecessary frequency. On the contrary, if the pore size of the prefilter is too large compared with the pore size of the main filter medium, the surface of the main filter medium will become coated with larger particles. For example, polyurethane having 70 ppi (pores per inch) as the main filter medium can be used with 120 mesh screen as a prefilter.

1-c. According to comparative tests with a diatomaceous earth filter, it was observed that, by use of a prefilter made of polyurethane, the life span of the main filter, also made of polyurethane, could be increased 25 times over the life of the diatomaceous earth filter, and the dirt holding capacity could be increased 20 times. The bed depth of the main filter was 5 inches and the thickness of the prefilter was ⅛ inch.

1-d. Experiments with activated carbon (50 to 325 mesh) were carried out in a water filtration system. The carbon was introduced upstream of the prefilter. Both prefilter and main filter were made of polyurethane foam. There was no indication that the carbon leaked through the main filter medium under controlled conditions with carbon of certain particle size. The filtrate was clear and the main filter medium became completely blackened throughout by carbon.

1-e. Immediately after the flow was suddenly changed or temporarily stopped, captured particles were released from the prefilter and main filter medium. Turbidity of the effluent was observed.

1-f. Air bubbles introduced into the filtering apparatus from the outside caused the release of particles from the prefilter and main filter medium in the same way as in Experiment 1-e above. For filtration, these occurences should be avoided, however, for cleaning the filter medium, interrupted flow, i.e., flow combined with air or unsteady flow, e.g., pulsated flow, can be used.

1-g. During backwashing, brushing or scouring the upstream surface of the prefilter medium aided cleansing considerably.

EXAMPLE II

A vacuum cleaner was used for experimentation with air in accordance with the present invention. Dust particles, which passed through the prefilter, were captured in the main filter medium. The main filter medium did not deform noticeably during operation. The flow velocity of the air was typically 5 feet per second. After experimental use, the main filter body was cut in half and particles were found to have penetrated deeply into it. The amount of dust collected in the filter medium weighed more than the filter medium itself.

Various fabrics and meshes, including stainless steel, as prefilter were also tested. It is concluded that mesh and fabric having the proper opening size can be used as a prefilter, as well as open-celled polymeric foam.

The present invention thus contemplates a filtration system in which a prefilter medium and a main filter medium cooperate in such a way as to extend greatly the life of the main filter medium while inexpensively controlling the prefilter medium. Since certain changes may be made in the foregoing disclosure without departing from the scope of the present invention, it is intended that all matter described in the foregoing specification or shown in the accompanying drawings be interpreted in an illustrative and not in a limiting sense.

What is claimed is:

1. A filtration system comprising:
a. a housing including a fixed body and a detachable head, said head having an inlet port, said fixed body having a backwash port and an outlet port;
b. a prefilter medium mounted within said housing between said fixed body and said detachable head adjacent said inlet port, said prefilter medium readily removed from said housing by detaching said head, said prefilter medium composed of an open-celled polymeric foam, at least ninety percent of the pore sizes of said prefilter medium being in the range of 0.05 to 0.0005 inch;
c. a main filter medium mounted within said body adjacent said outlet port, said main filter medium spaced from said prefilter medium, a chamber formed between said main filter medium and said prefilter medium, said backwash port communicating with said chamber, said main filter medium composed of an open-celled polymeric foam, at least ninety percent of the pore sizes of said main filter medium being in the range of 0.05 to 0.0005 inch;
d. said prefilter medium and said main filter medium disposed in a flow path of a fluid, said main filter medium spaced downstream of said prefilter medium, said prefilter medium having a thickness in the direction of said flow which is less than one-tenth the thickness of said main filter medium in the direction of said flow, the thickness of said prefilter medium in the direction of said flow path being no greater than one-half inch in the direction of said flow path;
e. pump means for causing said fluid to flow;
f. first control means including first conduit means, said first control means having opened and closed states, said first control means communicating with said pump means and said inlet port via said first conduit means;
g. second control means including second conduit means, said second control means having opened and closed states, said second control means communicating with said pump means and said backwash port via said second conduit means;
h. third control means including third conduit means, said third control means having opened and closed states, said third control means communicating with said first control means and said inlet port via said third conduit means, said third conduit means communicating with a waste stream; and
i. fourth control means including fourth conduit means, said fourth control means having opened and closed states, said fourth control means communicating with said outlet port via said fourth conduit means;
j. said pump means causing said fluid to flow successively in a filtration flow direction through said inlet port, said prefilter medium, said chamber between said prefilter medium and said main filter medium, said main filter medium, and said outlet port when said first and fourth control means are in said opened state and said second and third control means are in said closed state;
k. said pump means causing said fluid to flow successively in a backwash flow direction through said backwash port, said chamber between said prefilter medium and said main filter medium, said prefilter medium, and said inlet port into said waste stream when said second and third control means are in said opened state and said first and fourth control means are in said closed state, said backwash flow direction through said prefilter medium being opposite said filtration flow direction through said prefilter medium, backwashing and replacement of said prefilter medium readily effected for prolonged life of said main filter medium, said relatively thin prefilter medium operative to capture only particles larger than the pore sizes and to pass particles smaller than the pore sizes.

* * * * *